(12) United States Patent
Kim (10) Patent No.: US 11,840,281 B2
(45) Date of Patent: Dec. 12, 2023

(54) REAR BODY STRUCTURE

(71) Applicants: HYUNDAI MOTOR COMPANY, Seoul (KR); KIA CORPORATION, Seoul (KR)

(72) Inventor: Sung Won Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 77 days.

(21) Appl. No.: 17/523,407

(22) Filed: Nov. 10, 2021

(65) Prior Publication Data

US 2022/0340209 A1  Oct. 27, 2022

(30) Foreign Application Priority Data

Apr. 26, 2021 (KR) .................. 10-2021-0053576

(51) Int. Cl.
*B62D 25/08* (2006.01)

(52) U.S. Cl.
CPC ................... *B62D 25/088* (2013.01)

(58) Field of Classification Search
CPC ...... B62D 25/088; B62D 25/08; B62D 21/25; B62D 25/087
See application file for complete search history.

(56) References Cited

U.S. PATENT DOCUMENTS

| 6,010,181 | A | * | 1/2000 | Robbins | B60G 15/068 296/203.04 |
|---|---|---|---|---|---|
| 6,088,918 | A | * | 7/2000 | Corporon | B60G 15/063 29/469 |
| 2014/0021748 | A1 | * | 1/2014 | Park | B62D 25/08 296/203.04 |
| 2018/0170454 | A1 | * | 6/2018 | Kato | B62D 33/04 |

FOREIGN PATENT DOCUMENTS

| CN | 104648493 A | * | 5/2015 | ........... B62D 25/087 |
|---|---|---|---|---|
| DE | 102011056885 A1 | * | 4/2013 | ........... B60G 13/003 |
| DE | 202013004133 U1 | * | 9/2014 | ........... B62D 21/152 |
| DE | 102018001541 A1 | * | 9/2018 | ............ B60G 13/00 |
| EP | 1479596 A1 | * | 11/2004 | ........... B60G 13/003 |
| JP | 2014218149 A | * | 11/2014 | ............ B62D 25/02 |
| KR | 20010066506 A | * | 7/2001 | |
| KR | 20060071799 A | * | 6/2006 | ............ B62D 25/08 |
| KR | 100925959 B1 | * | 11/2009 | ........... B62D 25/087 |
| WO | WO-2012121142 A1 | * | 9/2012 | ............ B62D 25/02 |
| WO | WO-2016199499 A1 | * | 12/2016 | ............ B62D 25/08 |
| WO | WO-2019192390 A1 | * | 10/2019 | |

* cited by examiner

*Primary Examiner* — Lori Lyjak
(74) *Attorney, Agent, or Firm* — McDonnell Boehnen Hulbert & Berghoff LLP (57) ABSTRACT

A rear vehicle body structure includes a wheel housing including a wheel housing inner panel, a shock absorber mounting bracket mounted on the outside of the wheel housing inner panel, and a wheel housing reinforcement mounted inside the wheel housing inner panel and connected to the shock absorber mounting bracket.

15 Claims, 9 Drawing Sheets

REAR BODY STRUCTURE

CROSS REFERENCE TO RELATED APPLICATIONS

This application claims priority to and the benefit of Korean Patent Application No. 10-2021-0053576 filed in the Korean Intellectual Property Office on Apr. 26, 2021, the entire contents of which are incorporated herein by reference.

BACKGROUND

(a) Field

The present disclosure relates to a rear vehicle body structure. More particularly, the present disclosure relates to a rear vehicle body structure that improves the connectivity between the rear quarter of the vehicle and the package tray.

(b) Description of the Related Art

The connection structure of the vehicle's rear quarter and the package tray is highly sensitive to the vehicle body torsional strength of the upper body.

A general connection structure is a complex structure including many parts, and the actual connection is weak.

Vehicle body strength is a fundamental factor in R&H (Ride and Handling) as a driving performance, NVH (Nose, Vibration and Harshness) and durability, and a high strength vehicle body is required. Therefore, a robust design for the most sensitive area is required to improve vehicle body strength.

In particular, in the case of sedan type vehicle, the connection structure of the rear quarter and the package tray is sensitive to the torsion strength of the vehicle body, so a simple connection structure and a cross-section connection structure between members are required for load distribution in suspension.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a rear vehicle body structure with improved connectivity between the vehicle's rear quarter and the package tray.

A rear vehicle body structure according to an exemplary embodiment of the present disclosure may include a wheel housing including a wheel housing inner panel, a shock absorber mounting bracket mounted on the outside of the wheel housing inner panel, and a wheel housing reinforcement mounted inside the wheel housing inner panel and connected to the shock absorber mounting bracket.

The wheel housing reinforcement may be formed in the shape of an inverted "U" shape and may be connected to the rear floor.

The wheel housing reinforcement may include a first end connected to a rear floor cross member mounted in the vehicle body width direction on the rear floor, a second end connected to a vertical member vertically connected to the rear floor and a wheel housing upper reinforcement connected to the first end and the second end.

The wheel housing upper reinforcement may be curved according to the shape of the wheel housing inner panel from the first end and the second end.

The rear vehicle body structure according to an exemplary embodiment of the present disclosure may further include a quarter vertical reinforcement mounted on the wheel housing and a rear quarter, and wherein the wheel housing upper reinforcement may be connected to the quarter vertical reinforcement.

The rear vehicle body structure according to an exemplary embodiment of the present disclosure may further include a package tray and an inclined connection connecting the package tray and the wheel housing.

The package tray may include a package tray panel and a package tray member connected to the package tray panel and disposed in the width direction of the vehicle body with a "U"-shaped cross-section.

The inclined connection may include an inclined connection body with a U" cross-section, coupled with the package tray member.

The inclined connection body may include an inner side end connected with the package tray member with the same cross-section shape as the package tray member and an outer side end that overlaps the shock absorber mounting bracket and mounts to the wheel housing.

The inclined connection may further include an inclined connection upper cover that is connected with the inclined connection body to form a closed cross-section.

The inclined connection upper cover may include a stepped portion formed in a step along its length direction.

The inclined connection upper cover may include an inner upper flange connected to the package tray panel and an outer upper flange that is curved from the inner upper flange and connected to the wheel housing inner panel and the wheel housing reinforcement.

The rear vehicle body structure according to an exemplary embodiment of the present disclosure may further include a transverse reinforcement connecting a rear quarter and the inclined connection.

The transverse reinforcement may be disposed on the same axis as the package tray member.

The transverse reinforcement may have an inverted "U"-shaped cross-section shape.

The rear vehicle body structure according to an exemplary embodiment of the present disclosure may further include a quarter vertical reinforcement mounted on the wheel housing and the rear quarter, wherein the transverse reinforcement is mounted overlapping the quarter vertical reinforcement.

According to the rear vehicle body structure according to an exemplary embodiment of the present disclosure, it is possible to improve R&H (Ride and Handling), NVH (Nose, Vibration and Harshness) and durability by improving the connectivity of the rear quarter and the package tray of the vehicle.

In addition, for the effects that can be obtained or predicted due to an exemplary embodiment of the present disclosure, it is to be disclosed directly or implicitly in the detailed description of an exemplary embodiment of the present disclosure. That is, various effects predicted according to an exemplary embodiment of the present disclosure will be disclosed within a detailed description to be described later.

BRIEF DESCRIPTION OF THE FIGURES

Since these drawings are for reference in explaining an exemplary embodiment of the present disclosure, the tech

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification.

Since the size and thickness of each component shown in the drawings are arbitrarily indicated for convenience of description, the present disclosure is not necessarily limited to the bar shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as . . . part, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment of the present disclosure will hereinafter be described in detail with reference to the accompanying drawings.

Figure 1:
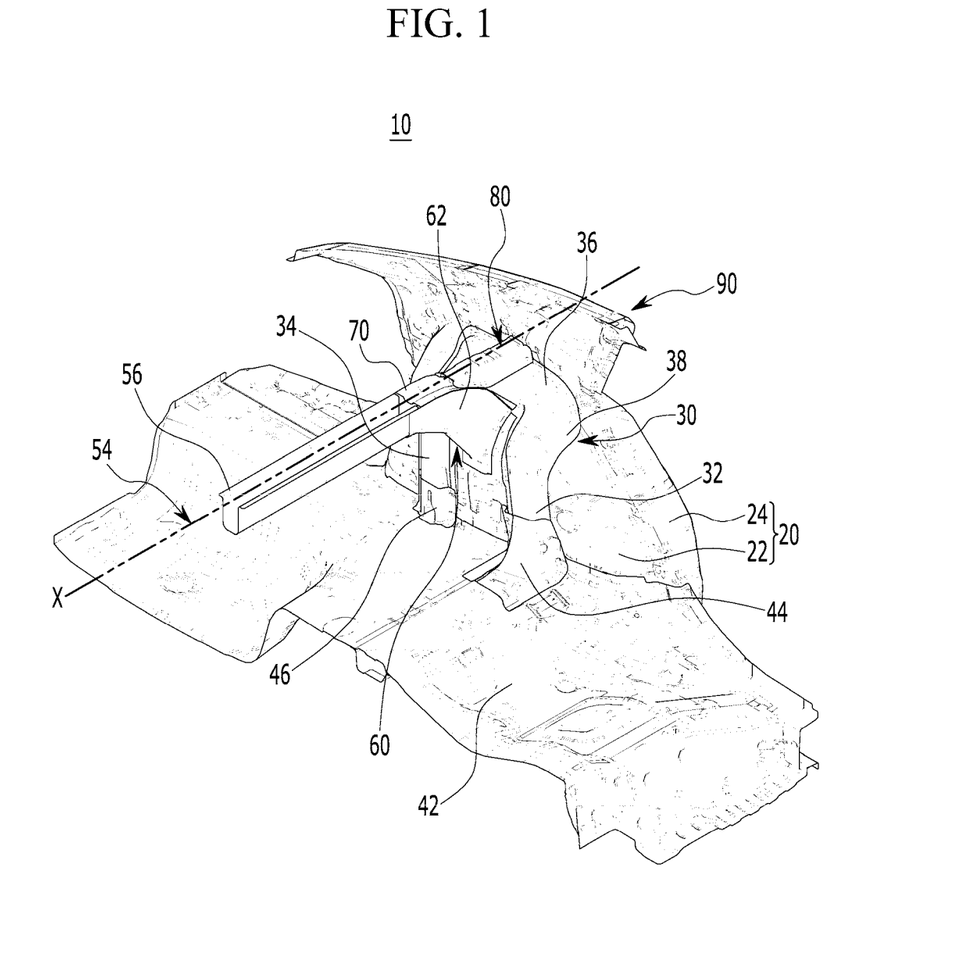
- FIG. 1 is a partial perspective view of the rear vehicle body structure according to an exemplary embodiment of the present disclosure viewed from the inside of the vehicle body.

FIG. 1 is a partial perspective view of the rear vehicle body structure according to an exemplary embodiment of the present disclosure viewed from the inside of the vehicle body.

Referring to FIG. 1, a rear vehicle body structure 10 according to an exemplary embodiment of the present disclosure may include a wheel housing 20 including a wheel housing inner panel 22 and a wheel housing outer panel 24 and a wheel housing reinforcement 30 mounted inside the wheel housing inner panel 22.

Figure 2:
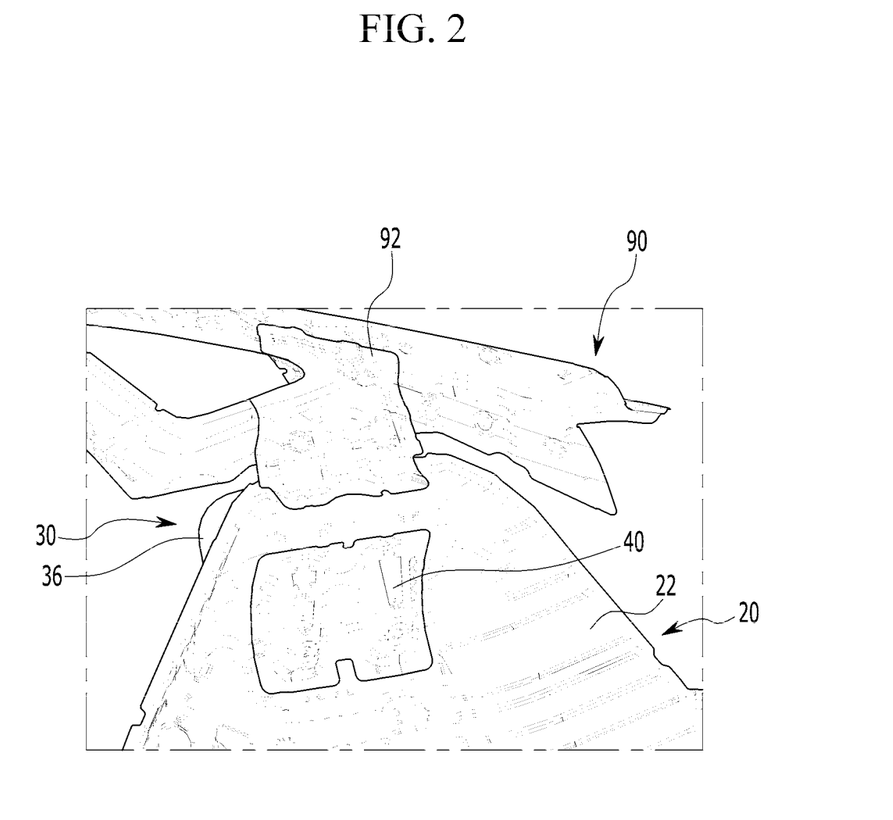
FIG. 2 and FIG. 3 is a partial perspective view of the rear vehicle body structure according to an exemplary embodiment of the present disclosure viewed from the outside of the vehicle body.
Figure 3:
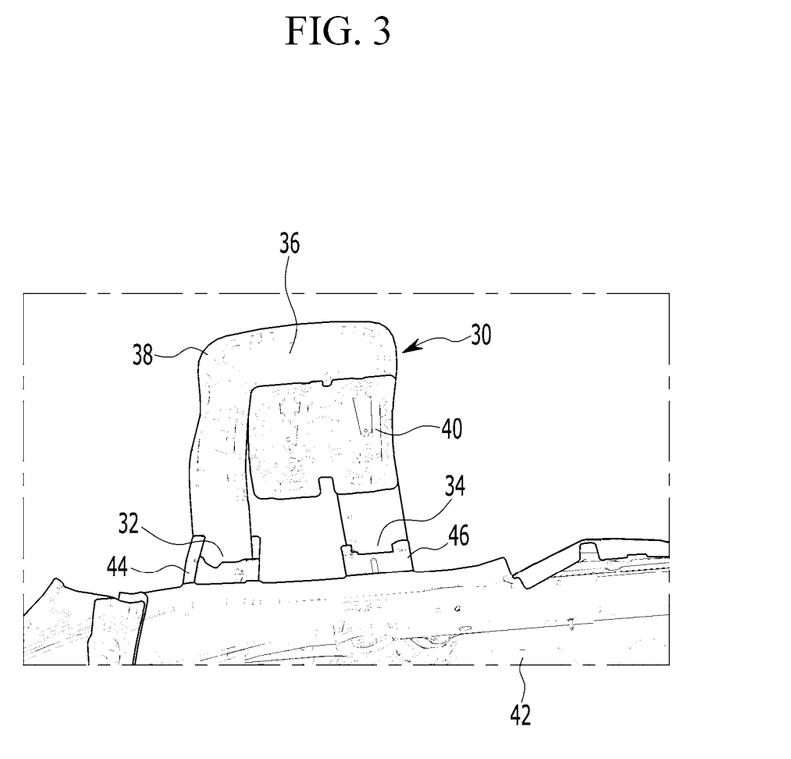

FIG. 2 and FIG. 3 is a partial perspective view of the rear vehicle body structure according to an exemplary embodiment of the present disclosure viewed from the outside of the vehicle body.

In FIG. 3, the wheel housing 20 is omitted.

Referring to FIG. 1 to FIG. 3, the rear vehicle body structure 10 according to an exemplary embodiment of the present disclosure may further include a shock absorber mounting bracket 40 mounted on the outside of the wheel housing inner panel 22, and the wheel housing reinforcement 30 may be connected with the shock absorber mounting bracket 40.

That is, the wheel housing reinforcement 30 may be connected with the shock absorber mounting bracket 40 through the wheel housing inner panel 22, and the wheel housing reinforcement 30 may absorb the road surface load transmitted through the shock absorber mounting bracket 40 and distribute it to the vehicle body.

The wheel housing reinforcement 30 is formed in the shape of an inverted "U" and may be connected to a rear floor 42.

The wheel housing reinforcement 30 may include a first end 32 connected to a rear floor cross member 44 mounted in the vehicle body width direction on the rear floor 42, a second end 34 connected to a vertical member 46 vertically connected to the rear floor 42, and a wheel housing upper reinforcement 36 connected to the first end 32 and the second end 34.

The wheel housing upper reinforcement 36 may be bent according to the shape of the wheel housing inner panel 22 from the first end 32 and the second end 34.

The wheel housing reinforcement 30 may further include a wheel housing reinforcement flange 38 that engages with the wheel housing inner panel 22, and the wheel housing reinforcement flange 38 may be welded with the wheel housing inner panel 22.

Therefore, the wheel housing reinforcement 30 may be matched to the wheel housing inner panel 22 to increase the strength of the wheel housing inner panel 22. Also, the wheel housing inner panel 22 may be connected to the rear floor 42 through the first end 32 and the second end 34 to increase the connection strength between the wheel housing inner panel 22 and the rear floor 42. In addition, the road load transmitted through the shock absorber mounting bracket 40 may be transmitted to the rear floor 42 through the first end 32 and the second end 34 and thus, it may improve R&H (Ride and Handling) and NVH (Nose, Vibration and Harshness) performance.

The rear vehicle body structure 10 according to an exemplary embodiment of the present disclosure further includes a quarter vertical reinforcement 92 mounted on the wheel housing 20 and a rear quarter 90, and the wheel housing upper reinforcement 36 may be connected to the quarter vertical reinforcement 92.

That is, the wheel housing reinforcement 30 may be connected with the quarter vertical reinforcement 92 through the rear quarter 90 to increase the vehicle body connection strength, and the road load transmitted through the shock absorber mounting bracket 40 may be transmitted to the vehicle body.

Figure 4:
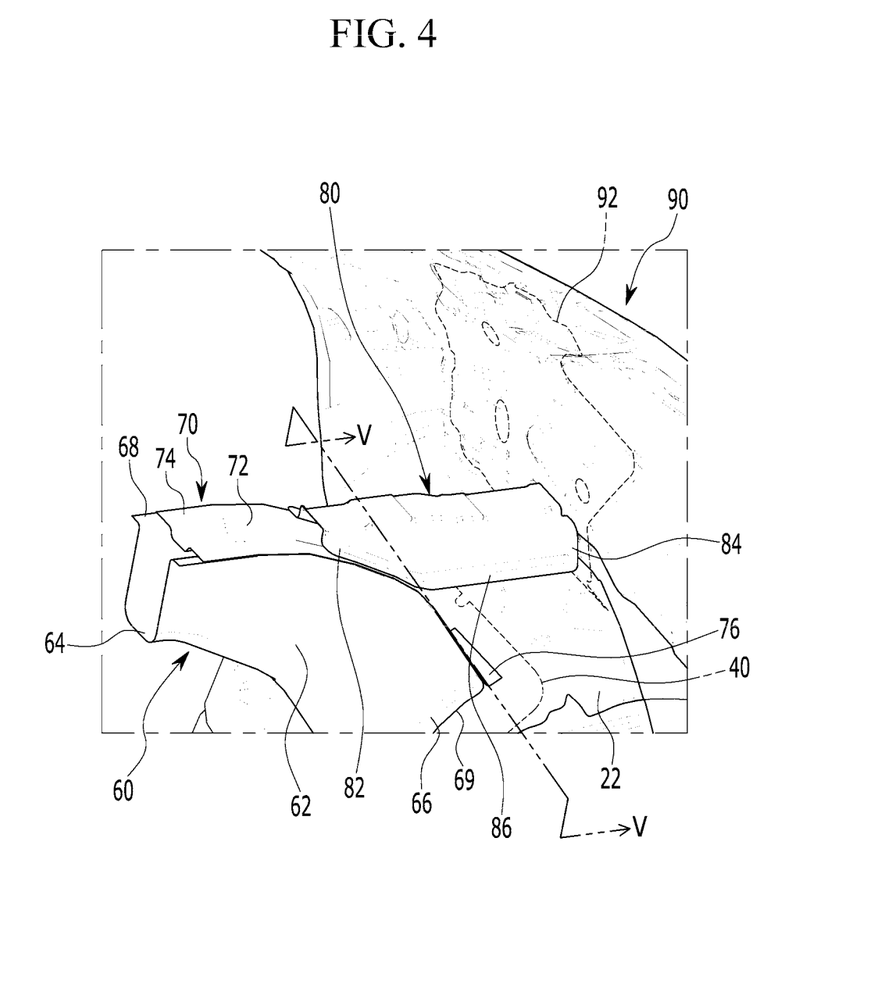
FIG. 4 is a partial perspective view of the rear vehicle body structure according to an exemplary embodiment of the present disclosure.
Figure 5:
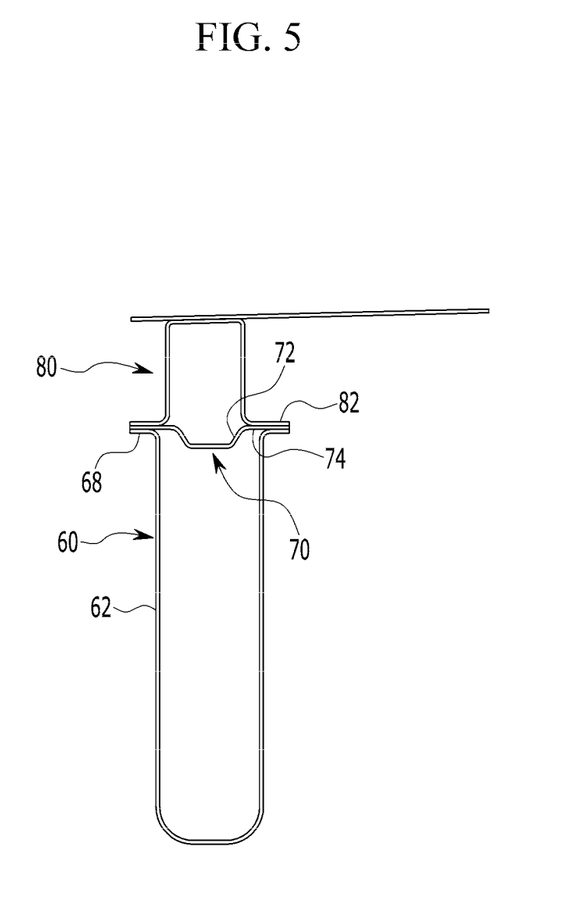
FIG. 5 is a cross-sectional view along the V-V line of FIG. 4.
Figure 6:
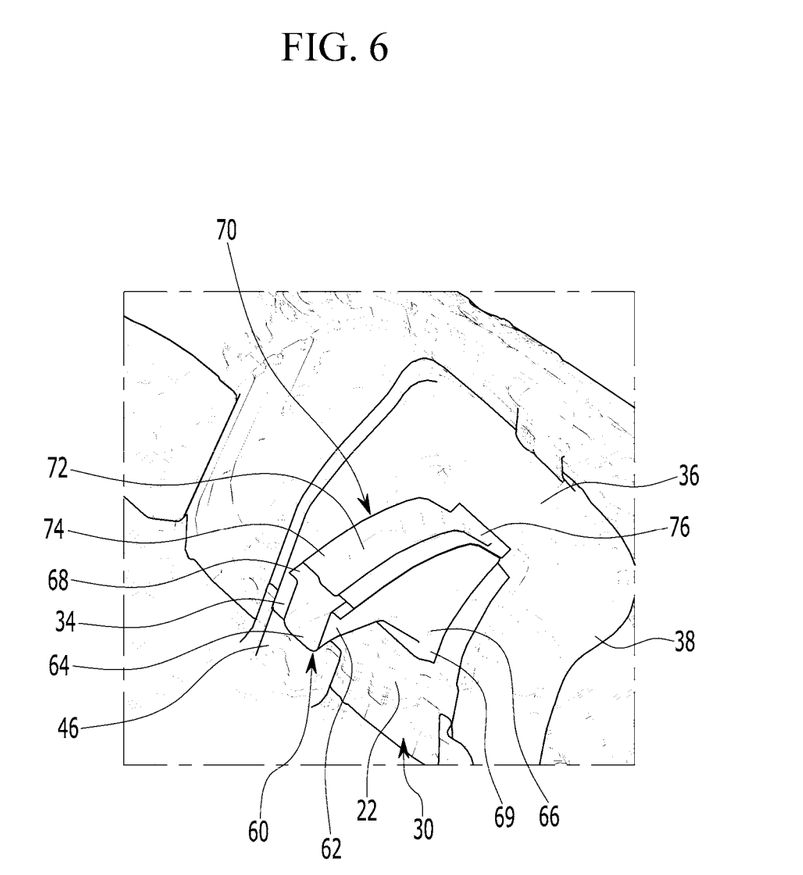
FIG. 6 is a perspective view showing an inclined connection portion and a transverse reinforcement of the rear vehicle body structure according to an exemplary embodiment of the present disclosure.

FIG. 4 is a partial perspective view of the rear vehicle body structure according to an exemplary embodiment of the present disclosure, FIG. 5 is a cross-sectional view along the V-V line of FIG. 4, and FIG. 6 is a perspective view showing an inclined connection portion and a transverse reinforcement of the rear vehicle body structure according to an exemplary embodiment of the present disclosure.

Figure 7:
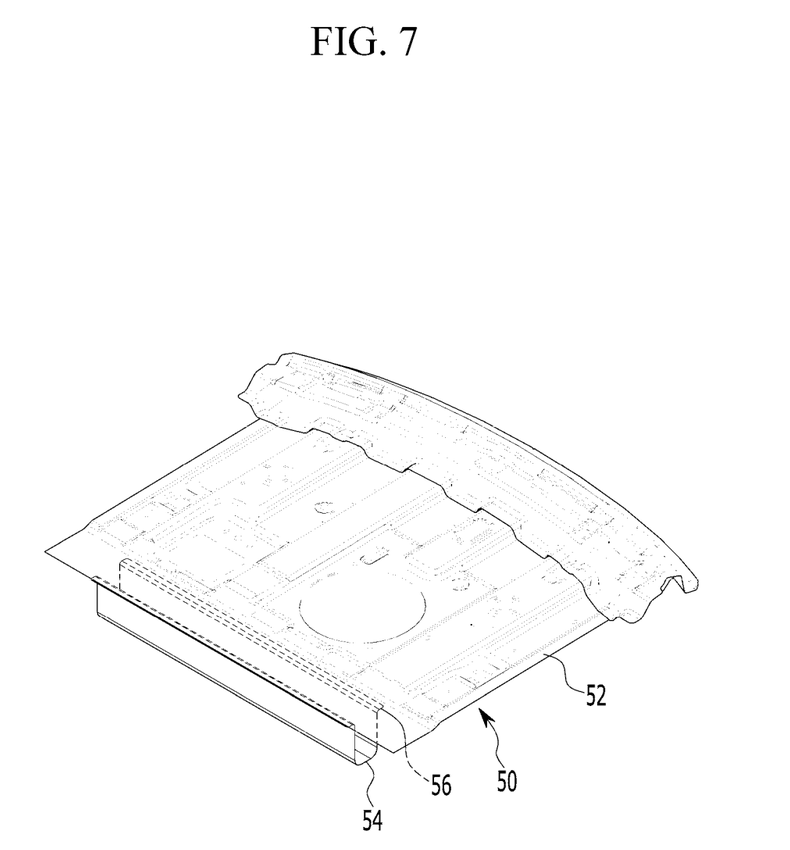
FIG. 7 is a perspective view showing a package tray of the rear vehicle body structure according to an exemplary embodiment of the present disclosure.
Figure 8:
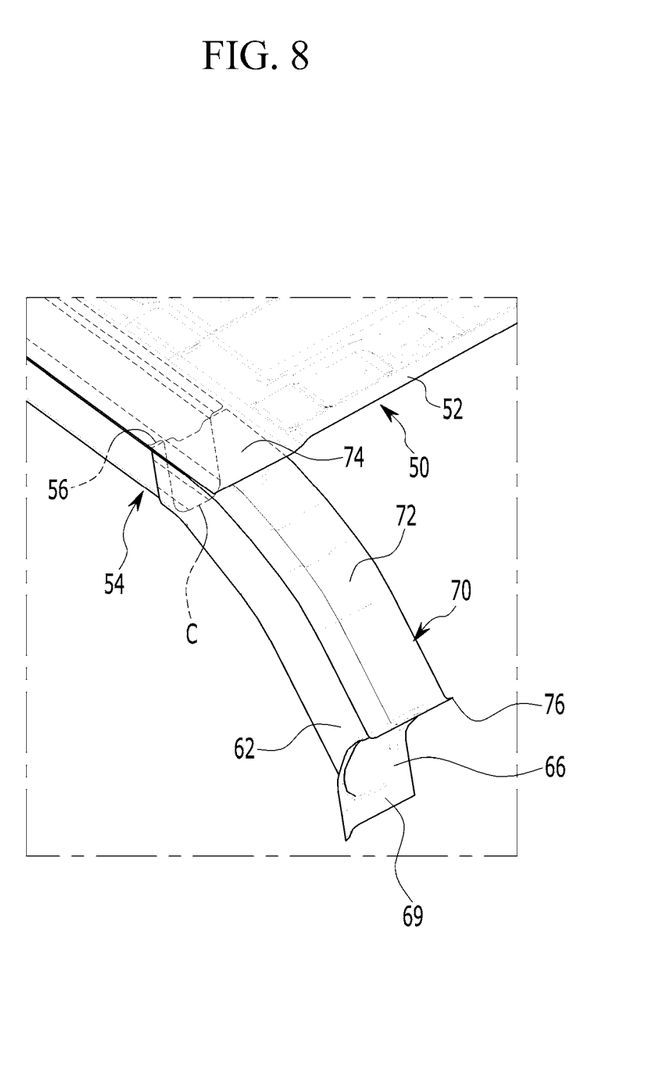
FIG. 8 is a perspective view showing the package tray and the inclined connection of the rear vehicle body structure according to an exemplary embodiment of the present disclosure.

FIG. 7 is a perspective view showing a package tray of the rear vehicle body structure according to an exemplary embodiment of the present disclosure and FIG. 8 is a perspective view showing the package tray and the inclined connection of the rear vehicle body structure according to an exemplary embodiment of the present disclosure.

Referring to FIG. 1 to FIG. 8, the rear vehicle body structure 10 according to an exemplary embodiment of the present disclosure may further include a package tray 50 and an inclined connection 60 for connecting the package tray 50 and the wheel housing 20.

As shown in FIG. 7 and FIG. 8, the package tray 50 may include a package tray panel 52 and a package tray member 54 connected to the package tray panel 52 and disposed in the width direction of the vehicle body with a "U"-shaped cross-section. The package tray member 54 may include a package tray member flange 56 connected to the package tray panel 52.

The length direction strength of the package tray member 54 may be secured by the "U"-shaped cross-section of the package tray member 54 and the shape of the package tray member flange 56.

As shown in FIG. 6 and FIG. 8, the inclined connection 60 is connected with the package tray member 54, and may include an inclined connection body 62 having a "U"-shaped cross-section.

That is, as shown in FIG. 5 and FIG. 8, the package tray member 54 and the inclined connection body 62 are formed in a "U"-shaped cross-section C to increase connection strength.

The inclined connection body 62 may include an inner side end 64 engaged with the package tray member 54 in the same cross-section shape as the package tray member 54, and an outer side end 66 overlapping the shock absorber mounting bracket 40 and mounted to the wheel housing 20 as shown in FIG. 4 and FIG. 8.

In the detailed description and claims of the present disclosure, the meaning of the "overlap" means directly or indirectly connected to transmit the impact load.

The outer side end 66 may be connected to the shock absorber mounting bracket 40 through the wheel housing inner panel 22, and the inner side end 64 is connected to the package tray member 54. Therefore, the inclined connection 60 may transmit the road load transmitted through the shock absorber mounting bracket 40 to the package tray member 54 through the inner side end 64.

The inclined connection 60 may further include an outer side end flange 69 that is curved from the outer side end 66 and connected to the wheel housing 20.

The inclined connection 60 may further include an inclined connection upper cover 70 connected with the inclined connection body 62 to form a closed cross-section.

As shown in FIG. 6, the inclined connection upper cover 70 may include a stepped portion 72 stepped along the length direction thereof, and the stepped portion 72 may increase the length direction strength of the inclined connection upper cover 70.

As shown in FIG. 5, a body flange 68 engaged with the inclined connection upper cover 70 may be formed on the upper part of the inclined connection 60.

As shown in FIG. 4, FIG. 6 and FIG. 8, the inclined connection upper cover 70 may include an inner upper flange 74 connected to the package tray panel 52, and an outer upper flange 76 which is curved from the inner upper flange 74 and connected to the wheel housing inner panel 22 and the wheel housing reinforcement 30.

The inclined connection upper cover 70 is combined with the inclined connection body 62 to form a closed cross-section, connected to the wheel housing inner panel 22, and the inclined connection upper cover 70 may deliver the road load transmitted from the shock absorber mounting bracket 40 through the wheel housing inner panel 22 to the package tray 50.

The rear vehicle body structure 10 according to an exemplary embodiment of the present disclosure may further include a transverse reinforcement 80 connecting the rear quarter 90 and the inclined connection 60.

The transverse reinforcement 80 may be dispose on the same axis line X as the package tray member 54. That is, as shown in FIG. 1, the transverse reinforcement 80 is disposed on the same axis line X as the package tray member 54 to transfer the load transmitted from the rear quarter 90 to the package tray member 54.

The transverse reinforcement 80 may have an inverted "U" cross-section shape.

As shown in FIG. 4, the transverse reinforcement 80 may include a transverse inner flange 82 connected to the inclined connection upper cover 70, a transverse outer flange 84 connected to the rear quarter 90 and a transverse body flange 86 of which connects the transverse inner flange 82 and the transverse outer flange 84. The transverse reinforcement 80 increases the connection strength between the rear quarter 90 and the package tray 50 through the inverted "U"-shaped cross-section shape and the shape of the transverse inner flange 82, the transverse outer flange 84 and the transverse body flange 86, and can transmit the load smoothly.

The transverse reinforcement 80 may be mounted overlapping the quarter vertical reinforcement 92. The transverse reinforcement 80 may be mounted in a position corresponding to the quarter vertical reinforcement 92 to increase the connection strength between the vehicle body and the package tray 50.

Referring to FIG. 5, the transverse reinforcement 80 and the inclined connection upper cover 70 form a closed cross-section to increase the strength of the transverse reinforcement 80. In addition, the inclined connection body 62 and the inclined connection upper cover 70 form a closed cross-section to increase the strength of the inclined connection 60.

Figure 9:
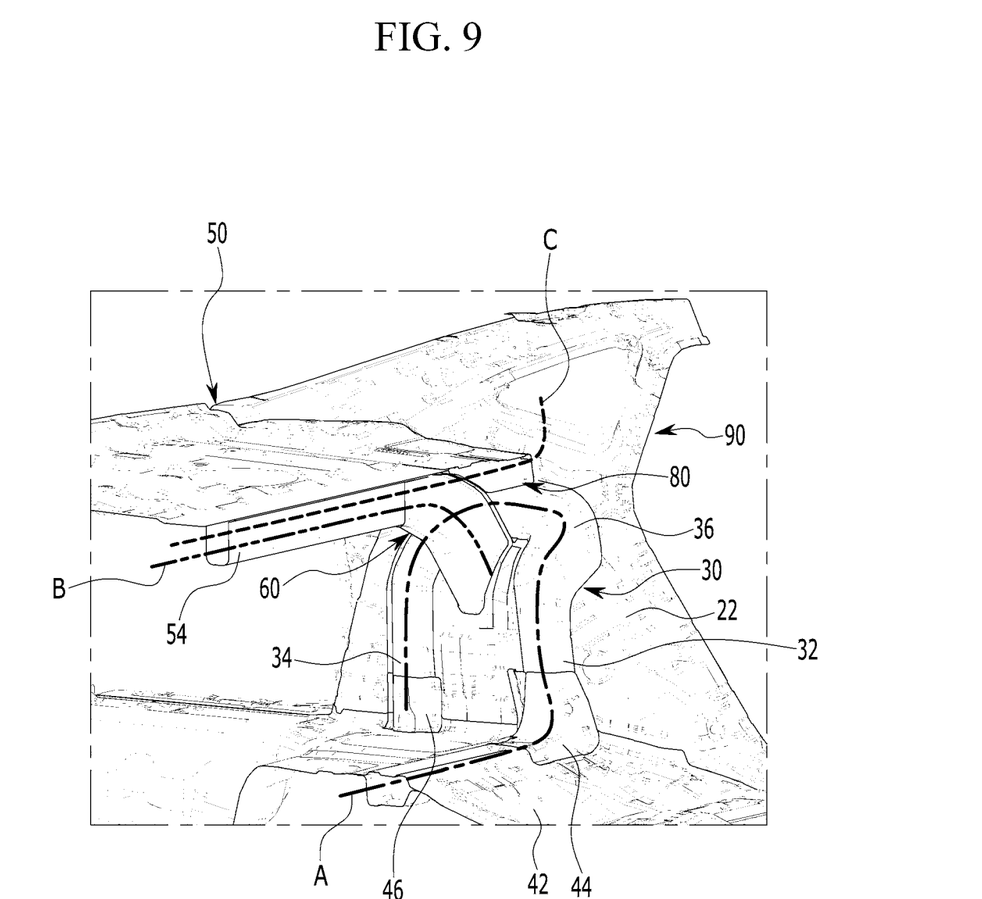
FIG. 9 is a perspective view showing load paths of the rear vehicle body structure according to an exemplary embodiment of the present disclosure.

FIG. 9 is a perspective view showing load paths of the rear vehicle body structure according to an exemplary embodiment of the present disclosure.

As shown in FIG. 9, in the rear vehicle body structure 10 according to an exemplary embodiment of the present disclosure, the wheel housing reinforcement 30 and the wheel housing inner panel 22 are closely coupled so as to form a first load pass A in which the road load transmitted from the shock absorber mounting bracket 40 is transmitted to the rear floor cross member 44, the vertical member 46 and the rear floor 42.

In addition, in the rear vehicle body structure 10 according to an exemplary embodiment of the present disclosure, the inclined connection 60 is connected to the wheel housing inner panel 22 so as to form a second load path B in which the road load transmitted from the shock absorber mounting bracket 40 is transferred to the package tray 50.

In addition, in the rear vehicle body structure 10 according to an exemplary embodiment of the present disclosure, the transverse reinforcement 80 is connected to the rear quarter 90 to form a third load path C that transfers the vehicle body load to the package tray 50.

That is, a plurality of load paths A, B and C are formed in the rear vehicle body structure 10 according to an exemplary embodiment of the present disclosure, so that the connection strength of the vehicle body may be increased, and it is easy to distribute the road load. In addition, it is possible to protect the vehicle occupants by distributing the collision load in the event of a car body collision.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A rear vehicle body structure comprising:
   a wheel housing including a wheel housing inner panel;
   a shock absorber mounting bracket mounted on an outside of the wheel housing inner panel; and
   a wheel housing reinforcement mounted inside the wheel housing inner panel and connected to the shock absorber mounting bracket;
   wherein the wheel housing reinforcement has an inverted "U" shape, and is connected to a rear floor.

2. The rear vehicle body structure of claim 1, wherein the wheel housing reinforcement comprises:
   a first end connected to a rear floor cross member mounted in a vehicle body width direction on the rear floor;
   a second end connected to a vertical member vertically connected to the rear floor; and
   a wheel housing upper reinforcement connected to the first end and the second end.

3. The rear vehicle body structure of claim 2, wherein the wheel housing upper reinforcement is curved according to the shape of the wheel housing inner panel from the first end to the second end.

4. The rear vehicle body structure of claim 2, further comprising a quarter vertical reinforcement mounted on the wheel housing and a rear quarter, wherein the wheel housing upper reinforcement is connected to the quarter vertical reinforcement.

5. A rear vehicle body structure comprising:
   a wheel housing including a wheel housing inner panel;
   a shock absorber mounting bracket mounted on an outside of the wheel housing inner panel;
   a wheel housing reinforcement mounted inside the wheel housing inner panel and connected to the shock absorber mounting bracket;
   a package tray; and
   an inclined connection connecting the package tray and the wheel housing.

6. The rear vehicle body structure of claim 5, wherein the package tray comprises:
   a package tray panel; and
   a package tray member connected to the package tray panel and disposed in the width direction of the vehicle body having a "U"-shaped cross-section.

7. The rear vehicle body structure of claim 6, wherein the inclined connection comprises:
   an inclined connection body having a "U"-shaped cross-section and coupled with the package tray member.

8. The rear vehicle body structure of claim 6, wherein the inclined connection body comprises:
   an inner side end connected with the package tray member, the inner side end having the same cross-section shape as the package tray member; and
   an outer side end that overlaps the shock absorber mounting bracket and is configured to mount to the wheel housing.

9. The rear vehicle body structure of claim 7, wherein the inclined connection further comprises an inclined connection upper cover that is connected with the inclined connection body to form a closed cross-section.

10. The rear vehicle body structure of claim 9, wherein the inclined connection upper cover comprises a stepped portion formed in a step along a length direction of the inclined upper cover.

11. The rear vehicle body structure of claim 9, wherein the inclined connection upper cover comprises:
    an inner upper flange connected to the package tray panel; and
    an outer upper flange that is curved away from the inner upper flange, and connected to the wheel housing inner panel and the wheel housing reinforcement.

12. The rear vehicle body structure of claim 5, further comprising a transverse reinforcement connecting a rear quarter and the inclined connection.

13. The rear vehicle body structure of claim 12, wherein the transverse reinforcement is disposed on the same axis as the package tray member.

14. The rear vehicle body structure of claim 12, wherein the transverse reinforcement has an inverted "U"-shaped cross-section.

15. The rear vehicle body structure of claim 12, further comprising a quarter vertical reinforcement mounted on the wheel housing and the rear quarter, wherein the transverse reinforcement is mounted overlapping the quarter vertical reinforcement.

* * * * *